United States Patent [19]

Emminger

[11] 4,088,292
[45] May 9, 1978

[54] WALL HANGAR DEVICE

[76] Inventor: Mary Souhan Emminger, P.O. Box 36384, Dallas, Tex. 75235

[21] Appl. No.: 622,453

[22] Filed: Oct. 15, 1975

Related U.S. Application Data

[63] Continuation of Ser. No. 524,480, Nov. 18, 1974, which is a continuation of Ser. No. 360,144, May 14, 1973, abandoned.

[51] Int. Cl.² .............................................. F16M 13/00
[52] U.S. Cl. .................................. 248/205 R; 248/304; 403/4
[58] Field of Search ................. 248/205 R, 207, 221, 248/222, 243, 274, 288, 303, 304; 403/4

[56] References Cited

U.S. PATENT DOCUMENTS

| 453,036 | 5/1891 | Brady | 248/207 |
| 932,570 | 8/1909 | Perrine | 248/221 |
| 2,278,307 | 3/1942 | Eisler | 248/205 R |
| 2,628,805 | 2/1953 | Smalley | 248/221 |
| 3,260,489 | 7/1966 | Hentzi | 248/304 X |
| 3,712,015 | 1/1973 | Nelson | 248/243 |
| 3,765,344 | 10/1973 | Ferdinand | 248/243 |

Primary Examiner—William H. Schultz
Attorney, Agent, or Firm—Joseph P. Gastel

[57] ABSTRACT

A wall hangar device of unitary construction includes a shank portion the cross-section of which is a six or eight sided regular polygon, whereby the shank portion of the hanger device has three or four pairs of opposing sides. Between each pair of opposing sides of the shank is a pair of openings through which may be passed fastening devices such as screws. The top of the shank portion extends outwardly to form an arm portion adapted to receive an article or support therefor. By suitably choosing one of the pairs of opposing sides and passing through the openings therein the screws and securing same to a surface, any one of a plurality of angular relationships between the arm and the mounting surface may be chosen.

15 Claims, 4 Drawing Figures

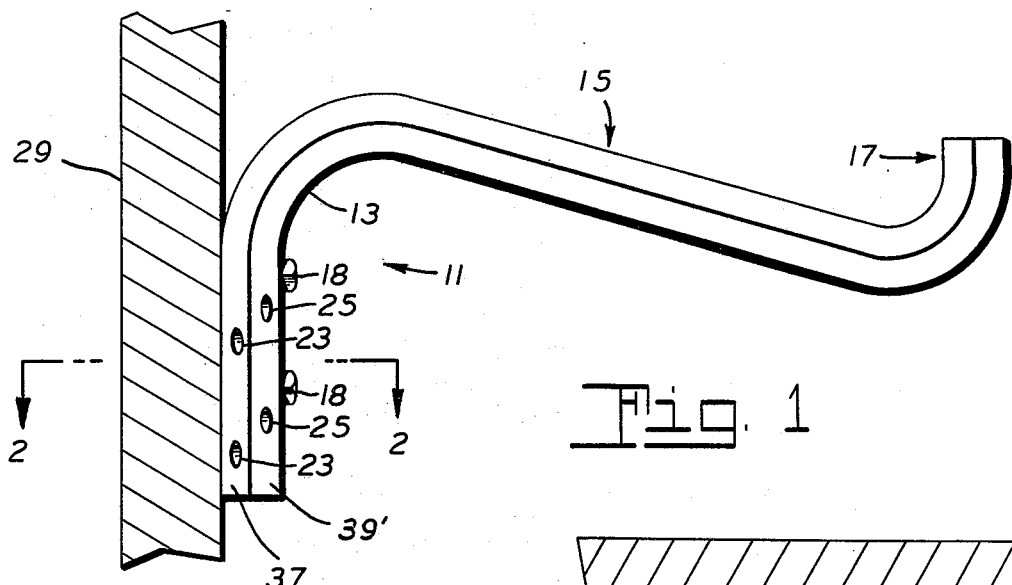
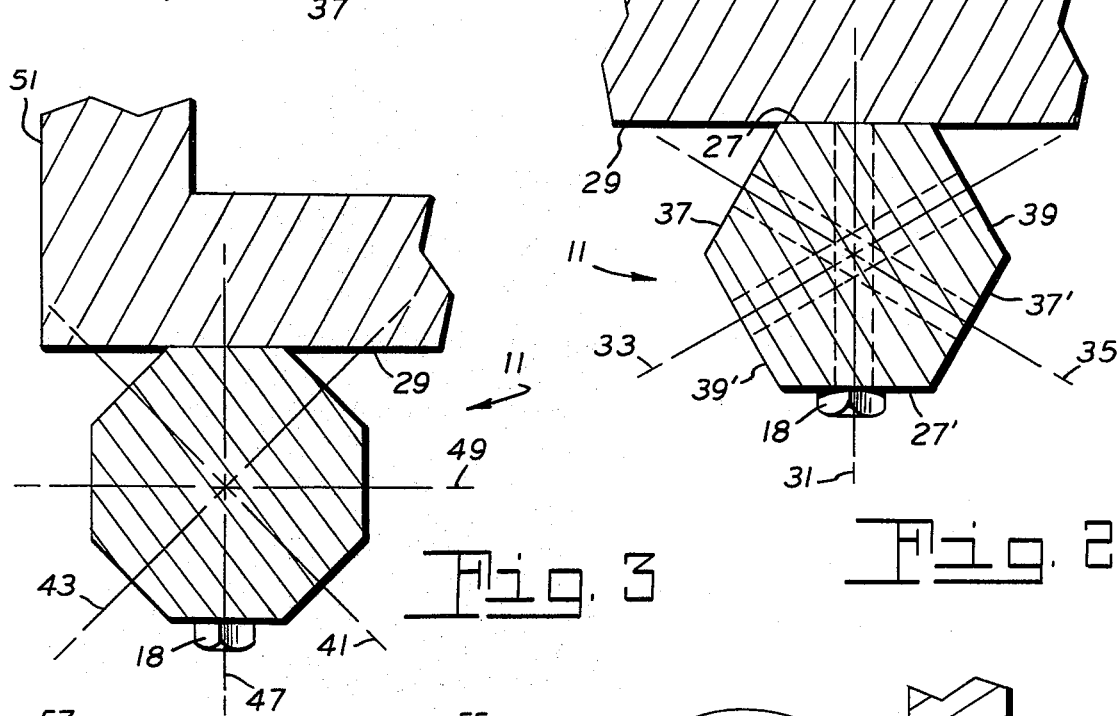
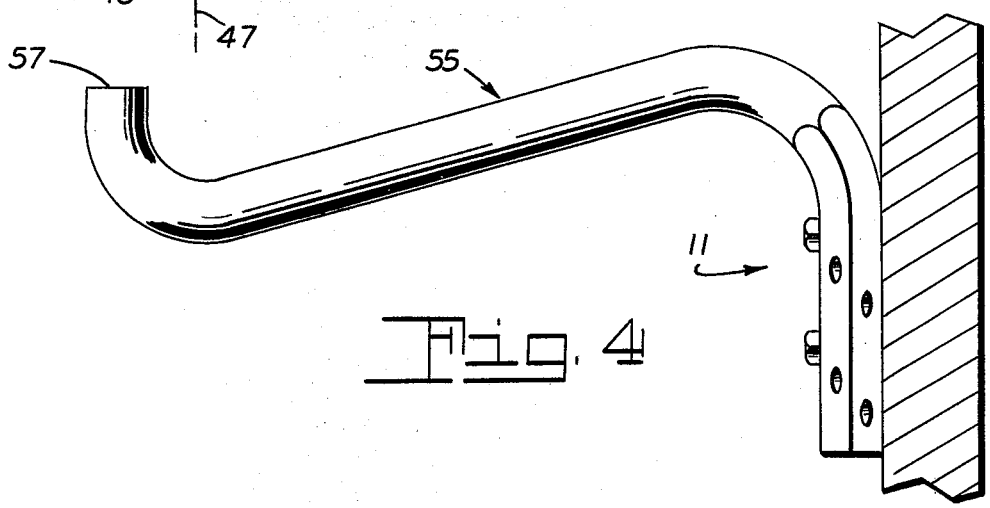

WALL HANGAR DEVICE

This is a continuation, of application Ser. No. 524,480 filed on Nov. 18, 1974, which is a continuation of Ser. No. 360,144, filed May 14, 1973, now abandoned.

BACKGROUND OF THE INVENTION

This invention relates generally to wall hangar devices and more particularly to wall hangar devices of unitary construction, yet capable of assuming a plurality of angular positions with respect to the wall or surface on which they are mounted.

It is known in the art to have a wall mounted hangar device which is of unitary construction, but all such known devices are capable of assuming only a single, fixed angular position with respect to the surface on which they are mounted. Also known in the art are wall mounted hangar devices capable of assuming a plurality, or in some cases an infinite number of angular positions with respect to the surface on which they are mounted, but such devices are constructed of two or more pieces, and thus are relatively more expensive to produce and complicated to mount than a device of unitary construction.

OBJECTS AND SUMMARY OF THE INVENTION

Accordingly, it is a principal object of this invention to provide an improved wall hangar device of unitary construction, yet capable of assuming a plurality of angular positions with respect to the surface on which it is mounted.

Another object of this invention is to provide an improved wall hangar device of unitary construction which is relatively economical to produce and which can be installed with relative ease.

According to one aspect of the invention, a wall hangar device is constructed of a moldable plastic material. The hangar has a down-turned or shank portion, the top of which extends outwardly into an arm portion. The arm portion is suitably formed to suspend a desired article. The shank portion of the hangar in cross-section is polygonal, having an even number of sides, but not less than six. Between each pair of opposed sides there is formed one or more openings through which the body of a screw, nail or other suitable fastening device may be passed. Thus, for example, a wall hangar device having a shank portion which is a regular six sided polygon, is capable of being mounted on its arm extending either perpendicular to the mounting surface or with its arm at either of two 30° angular positions with respect to the mounting surface.

BRIEF DESCRIPTION OF THE DRAWINGS

FIG. 1 is a vertical elevation view of one embodiment of a wall hangar device according to the present invention;

FIg. 2 is a cross-sectional view of the shank portion of the wall hangar device taken along line 2—2 of FIG. 1;

FIG. 3 is a cross-sectional view of an alternate configuration of the shank portion of a wall-hangar device according to the present invention; and FIG. 4 is a front perspective view of a wall-hangar device according to the present invention.

DESCRIPTION OF THE PREFERRED EMBODIMENTS

For a better understanding of the present invention together with other and further objects and advantages thereof, reference is made to the following detailed description taken in conjunction with the above-described drawings.

Referring first to FIG. 1, a wall-hangar device according to the present invention includes a shank portion 11, the top part 13 of which bends outwardly to form an arm 15. The end 17 of the arm portion 15 curves upwardly to form a stop and support position for an article to be suspended by the wall-hangar device. Two faces, 37, 39' of the shank portion 11 each have a pair of openings 23, 25, respectively, formed through the shank and adapted to receive suitable fastening means (not shown) such as nails or screws. The device, as illustrated, is secured to a wall 29 by means of fasteners 18 going through a third pair of openings in the shank 11. As shown in FIG. 1, it is preferred that the arm portion 15 of the device have at least a slight downward slope as it extends out to the end 17, or as an alternative, the end 17 could be "hook-shaped." Either configuration will prevent the article being suspended from sliding down the arm 15.

Referring now to FIG. 2 there is shown a cross-section view of the shank portion, it being a regular even sided polygon, in this case having six sides. One side 27 is shown mounted against the face of a wall 29, for example. If the arm portion (not shown) extends along the line 31 intersecting the face 27 of the shank, then the arm will extend outward and be substantially perpendicular to the wall 29. If the arm portion extends along the lines 33 or 35, then the arm will be at an angle of approximately 30°, left or right, respectively, with respect to the wall. As illustrated in FIG. 1, it is understood that there wil be one or more slots or openings passing through the opposite faces of the shank portion of the hangar device. For example, there could be a first pair of spaced apart holes between the faces 27, 27', a second pair of spaced apart holes between the faces 37, 37' and a third pair of spaced apart holes between the faces 39, 39'. Thus, assuming that the arm portion of the device extended along the line 31, the device could be mounted with the arm perpendicular to the wall, with the arm at an angle of 30° to the left with respect to the wall, or with the arm at an angle of 30° to the right with respect to the wall.

FIG. 3 shows an alternate, eight sided configuration for the shank portion 11 of the device capable of being mounted with the arm at 45° angles right or left with respect to the wall 29 depending on whether the arm extends along the lines 41 or 43, respectively. Of course, if the arm extends along the line 47, it would be mounted perpendicular to the wall. In this configuration the arm could also be parallel to the wall or mounting surface if the arm extended along the line 49. This might be a desirable alternative if corner mounting is desired, but one of the corner surfaces, e.g., surface 51, is not suitable or available for mounting. Again the proper selection of openings through the shank between respective parallel faces will give the desired angular orientation of the arm portion of the device with respect to the wall 29 or other mounting surface.

As shown in FIG. 4, while according to the invention the cross-section of the shank portion 11 of the wall-hangar device is preferably a regular polygon having an even number of sides, this restriction need not apply to the arm 55 and end portion 57. As shown here, while the cross-section of the shank 11 is a regular, even sided polygon, the arm 55 and the end portion 57 have a generally circular cross-section along their lengths, or in the alternative could have an oval shaped cross section.

As presently understood the wall-hangar device of the present invention is preferably made of a moldable plastic material such as, for example, plexiglas, acrylic, stryene, polyvinyl chloride, etc., which may be either clear or tinted depending on design requirements or preferences. Recognizing that only one of the groups of openings through the shank portion will be utilized at any time, it may be desirable to provide decorative plugs to insert in the unused openings in the shank portion of the device.

While the invention has been shown and described as having either a six or eight-sided shank portion, it is to be understood that the shank portion may have any even number of sides greater than or equal to six. Also, while only one arm portion has been illustrated, it is readily apparent that the wall-hangar device according to the present invention may have a plurality of arms connected to a singular shank portion. Other modifications and changes within the spirit and scope of the present invention will be apparent to those skilled in the art. Therefore, it is intended that the invention not be limited to the specifics of the foregoing detailed description, but rather is to embrace the full scope of the claims.

What is claimed is:

1. A wall hangar device of substantially unitary construction comprising a shank portion, the top of which extends outwardly into an arm portion, said arm portion being adapted to support an article desired to be suspended, said shank portion having a polygonal cross-section with an even number of sides, said number of sides being equal to or greater than six, thereby forming a plurality of three or more pairs of opposed sides, each of said pairs of opposed sides having at least one opening passing therebetween, said openings adapted to have a fastening device passed therethrough, whereby a desired angular relationship between said device and the surface on which it is mounted is chosen by selection of one of the pairs of opposing sides of said shank portion for passing through the opening therebetween a fastening device to be secured to said surface.

2. A wall hangar device for selective mounting on a wall in any one of a plurality of different positions by fastener means extending through the shank portion of said hangar device comprising a shank portion, an arm portion extending transversely to said shank portion for supporting an article, a plurality of pairs of opposite side portions on said shank portion, at least two of said side portions being so oriented relative to each other so as to cause said arm portion to extend transversely outwardly at different angles and in directions which are in intersecting relationship with said wall when either of said two side portions is placed in effective abutting relationship with said wall, opening means in said shank portion extending between each pair of said plurality of pairs of opposite side portions for receiving fastening means which are also received directly by said wall on which said shank is mounted to thereby cause said arm portion to assume a desired transverse angular relationship relative to said wall when a preselected side portion of said shank portion is secured in effective abutting relationship with said wall by said fastening means passing through said opening means associated with said preselected side portion.

3. A wall hanger device as set forth in claim 2 including fastening means for extending through preselected opening means and into said wall for attaching said shank portion to said wall.

4. A wall hanger device as set forth in claim 3 wherein said shank portion and said arm portion are fabricated from a single piece of material.

5. A wall hanger device as set forth in claim 3 wherein said plurality of pairs of opposite side portions comprise at least three pairs of opposite side portions.

6. A wall hanger device as set forth in claim 5 wherein at least three of said side portions are oriented relative to each other so that as any one of said at least three side portions is placed in effective abutting relationship with said wall surface said arm will extend transversely outwardly at a different angle relative to said wall surface and in a direction which is in intersecting relationship therewith.

7. A wall hanger device as set forth in claim 6 wherein said opening means comprise at least two separate openings axially spaced along said shank portion.

8. A wall hanger device as set forth in claim 7 wherein said openings comprise bores.

9. A wall hanger device as set forth in claim 6 wherein the cross section of said shank portion is an even-sided regular polygon.

10. A wall hanger device as set forth in claim 6 wherein said at least three of said side portions are adjacent to each other.

11. A wall hanger device as set forth in claim 10 wherein said at least three of said side portions which are adjacent to each other are of substantially equal width.

12. A wall hanger device as set forth in claim 6 wherein a first portion of said arm portion relatively close to said shank portion is inclined downwardly to the horizontal when said shank portion is vertical, and wherein a second portion of said arm portion relatively remote from said shank portion is inclined upwardly relative to said first portion.

13. A wall hanger device for selective mounting on a wall in any one of a plurality of different positions by fastener means extending through the shank portion of said hanger device comprising a shank portion, an arm portion extending transversely to said shank portion for supporting an article, first and second opening means in said shank portion for receiving fastening means which are also received directly by said wall on which said shank is mounted, said first opening means having a first axis and said second opening means having a second axis which is circumferentially displaced on said shank portion from said first axis, to thereby cause said arm portion to assume a desired orientation relative to said wall when a preselected one of said first and second opening means receive said fastening means to secure said shank portion in effective abutting relationship with said wall by said fastening means passing through said preselected opening means and being received directly by said wall.

14. A wall hanger device as set forth in claim 13 including fastening means for extending through said preselected opening means and into said wall for attaching said shank portion to said wall.

15. A wall hanger device as set forth in claim 14 wherein said first and second opening means comprise bores which pass through said shank portion.

* * * * *